United States Patent
Lopatin et al.

(10) Patent No.: US 10,330,514 B2
(45) Date of Patent: Jun. 25, 2019

(54) APPARATUS FOR MONITORING A PREDETERMINED FILL LEVEL

(71) Applicant: Endress + Hauser GmbH + Co. KG, Maulburg (DE)

(72) Inventors: Sergej Lopatin, Lorrach (DE); Sascha D'Angelico, Rummingen (DE); Volker Dreyer, Lorrach (DE); Alexander Muller, Sasbach-Jechtingen (DE)

(73) Assignee: ENDRESS+HAUSER SE+CO.KG, Maulburg (DE)

(*) Notice: Subject to any disclaimer, the term of this patent is extended or adjusted under 35 U.S.C. 154(b) by 416 days.

(21) Appl. No.: 14/385,882

(22) PCT Filed: Feb. 22, 2013

(86) PCT No.: PCT/EP2013/053577
§ 371 (c)(1),
(2) Date: Sep. 17, 2014

(87) PCT Pub. No.: WO2013/143794
PCT Pub. Date: Oct. 3, 2013

(65) Prior Publication Data
US 2015/0047428 A1 Feb. 19, 2015

(30) Foreign Application Priority Data
Mar. 26, 2012 (DE) .................. 10 2012 102 589

(51) Int. Cl.
G01F 23/00 (2006.01)
G01F 25/00 (2006.01)
G01F 23/296 (2006.01)

(52) U.S. Cl.
CPC ...... *G01F 23/0069* (2013.01); *G01F 23/0007* (2013.01); *G01F 23/2967* (2013.01); *G01F 25/0061* (2013.01)

(58) Field of Classification Search
CPC .......................... G01F 23/296; G01F 23/2967
See application file for complete search history.

(56) References Cited

U.S. PATENT DOCUMENTS 3,777,277 A * 12/1973 Naber ................... H03B 23/00
331/179
4,199,726 A * 4/1980 Bukosky ............... G04G 3/022
327/105
(Continued)

FOREIGN PATENT DOCUMENTS

CN 1416522 A 5/2003
CN 1682097 A 10/2005
(Continued)

OTHER PUBLICATIONS

International Search Report, EPO, The Netherlands, dated Mar. 28, 2013.
(Continued)

*Primary Examiner* — Daniel S Larkin
(74) *Attorney, Agent, or Firm* — Bacon & Thomas, PLLC

(57) ABSTRACT

Apparatus for monitoring a predetermined fill level of a medium in a container, including a mechanically oscillatable unit, a driving/receiving unit for exciting the mechanically oscillatable unit to execute mechanical oscillations and for receiving the oscillations of the mechanically oscillatable unit, and an electronics unit for producing an electrical exciter signal and for evaluating an electrical, received signal. The electronics unit is embodied to excite the mechanically oscillatable unit by means of the driving/receiving unit to execute mechanical oscillations within a fixedly predetermined, narrow frequency band with discrete, sequentially following, exciter frequencies, wherein the frequency band contains the resonant frequency of the mechanically oscillatable unit in the case of an oscillation under standard conditions, and the electronics unit is embodied to detect whether, within the predetermined frequency band an oscillation of the mechanically oscillatable unit occurs, whose amplitude exceeds a predetermined threshold value.

10 Claims, 2 Drawing Sheets

(56) References Cited

U.S. PATENT DOCUMENTS

| | | | |
|---|---|---|---|
| 5,966,983 A * | 10/1999 | Pfeiffer | G01F 23/2961 |
| | | | 73/291 |
| 6,389,891 B1 | 5/2002 | D'Angelico | |
| 6,769,804 B2 * | 8/2004 | Kawakatsu | G01F 23/2967 |
| | | | 374/118 |
| 6,997,052 B2 | 2/2006 | Woehrle | |
| 2012/0085165 A1 | 4/2012 | Hortenbach | |
| 2013/0036816 A1 | 2/2013 | Urban | |
| 2013/0104647 A1 | 5/2013 | Lopatin | |

FOREIGN PATENT DOCUMENTS

| | | |
|---|---|---|
| DE | 3005851 A1 | 9/1981 |
| DE | 10014724 A1 | 9/2001 |
| DE | 102004036359 A1 | 11/2005 |
| DE | 102004059050 A1 | 6/2006 |
| DE | 102009026685 A1 | 12/2010 |
| DE | 102010028161 A1 | 10/2011 |
| DE | 102010028303 A1 | 12/2011 |
| DE | 102010030791 A1 | 1/2012 |
| EP | 0123189 A1 | 10/1984 |

OTHER PUBLICATIONS

German Search Report, DPMA, Munich, dated Dec. 17, 2012.
English Translation of the International Preliminary Report on Patentability, WIPO, Geneva, CH, dated Oct. 9, 2014.

* cited by examiner

APPARATUS FOR MONITORING A PREDETERMINED FILL LEVEL

TECHNICAL FIELD

The present invention relates to an apparatus for monitoring a predetermined fill level of a medium in a container. The predetermined fill level is a maximum or minimum limit-level to be monitored for a fluid or a bulk good in a container.

BACKGROUND DISCUSSION

Frequently used for detecting gases, liquids and bulk goods are vibronic measuring devices, which detect a change of the oscillation characteristics, such as, for example, frequency or amplitude, of an oscillatable unit. Serving for detection of liquids is, most often, an oscillatable unit in the form an oscillatory fork, whose oscillation frequency is evaluated. Such measuring devices are produced and sold by the applicant under the mark, Liquiphant, in a large number of variants. For registering a maximum limit level, the oscillation frequency is registered and compared with a predetermined limit value. If the limit value is exceeded, the measuring device switches into the covered state. Besides a maximum or minimum limit-level of a liquid, also the density or the viscosity is determinable based on the oscillation characteristics.

Known for limit level measurement of bulk goods are measuring devices having an oscillatable unit in the form of a rod or in the form of a fork. Such measuring devices are available from the applicant under the mark, Soliphant. Especially the amplitude of the oscillations of the oscillatable unit is evaluated in such case, since the oscillation amplitude of an oscillatable unit oscillating in a gaseous medium sinks upon the covering with medium, due to mechanical losses.

As a rule, the oscillation excitement occurs by means of an oscillatory electronic circuit, which produces an exciter signal from the received signal of the oscillatable unit. This oscillatory electronic circuit includes at least one frequency filter, a phase shifter and a signal amplifier and effects that the oscillatable unit is always excited to resonance.

In order to assure oscillation even in the case of stronger damping of the oscillatory system, the oscillatory electronic circuit must exhibit over a broad frequency range a stable phase shift and a high dynamic range. Furthermore, precision components are required, which determine the phase shift and amplification, in order even in the case of a change of the phase characteristics, for example, due to non-Newtonian liquids, to assure a correct switching behavior. Said requirements lead to a complicated construction of sensor and electronics.

SUMMARY OF THE INVENTION

An object of the invention is to provide a cost effective apparatus for vibronic limit-level registration comprising a mechanically oscillatable unit, a driving/receiving unit for exciting the mechanically oscillatable unit to execute mechanical oscillations and for receiving the oscillations of the mechanically oscillatable unit, and an electronics unit for producing an electrical exciter signal and for evaluating an electrical, received signal.

The object is achieved by features including that the electronics unit is embodied to excite the mechanically oscillatable unit by means of the driving/receiving unit to execute mechanical oscillations within a fixedly predetermined, narrow frequency band with discrete, sequentially following, exciter frequencies, wherein the frequency band contains the resonant frequency of the mechanically oscillatable unit in the case of oscillation under standard conditions, and that the electronics unit is embodied to detect whether, within the predetermined frequency band, an oscillation of the mechanically oscillatable unit occurs, whose amplitude exceeds a predetermined threshold value.

The terminology, resonant frequency at standard conditions, means here and in the following the resonant frequency of an oscillation in air at standard pressure and room temperature, for example, 20° C. The resonant frequency at standard conditions is calculable for a certain embodiment of an oscillatable unit or determinable during the course of manufacturing. The frequency band, within which the frequencies of the exciter signal lie for exciting the oscillatable unit to execute oscillations, is narrow, i.e. it includes only frequencies in a narrow region around the resonant frequency at standard conditions. The terminology, narrow frequency band, means a frequency range, which includes frequencies, which deviate by, at most, 15%, preferably by, at most, 5% from the resonant frequency at standard conditions. The exciter signal is never produced with frequencies, with which an oscillation in the solid or liquid medium would be excitable in the case of completely immersed oscillatable unit.

According to the invention, the electronics unit is embodied in such a manner that it excites the oscillatable unit by means of a frequency sweep of minimal bandwidth to execute oscillations only in the frequency range, in which the resonant frequency of an oscillatable unit not completely immersed in the medium to be detected is located. In an embodiment, the frequency range includes only frequencies, which correspond to the resonant frequency in air and other gases. In another embodiment, the frequency range includes, supplementally, frequencies, with which an oscillatable unit oscillates when immersed only partially, especially only slightly, in the medium or covered slightly with accretion of medium. If the oscillatable unit is at least essentially not covered by the medium to be detected, the oscillatable unit oscillates with an amplitude, which exceeds the predetermined limit value. The electronics unit detects preferably only whether such an oscillation occurs or not and produces correspondingly a switching signal, which tells whether the predetermined fill level to be monitored has been achieved. The apparatus is especially suitable as a so-called max-switch for monitoring a maximum allowable fill level, since, in such case, the freely oscillating state corresponds to the normal state.

For detecting the reaching of the fill level to be monitored, an absence of the oscillations is detected, this being possible with high reliability. In principle, however, also the reverse case is possible, in the case of which the occurrence of an oscillation upon the subceeding of a predetermined minimum fill level is detected.

In an embodiment of the apparatus, the electronics unit detects the amplitude of the electrical, received signal of the driving/receiving unit and compares it with a predetermined limit value. The limit value for the amplitude of the received signal is established in such a manner that it lies above arising signal noise and is exceeded in the case of a resonant oscillation.

In an embodiment, the frequency band includes frequencies between 85% and 105%, especially between 95% and 102%, of the resonant frequency at standard conditions. In the case of temperature changes, also the resonant frequency of the oscillatable unit changes. The frequency band is selected in such a manner that it includes, on the one hand, all resonance frequencies, which accompany the temperatures from the temperature range, for which the apparatus is specified, and, on the other hand, is as narrow as possible. Furthermore, the frequency band is predeterminable in such a manner that only resonance frequencies associated with a completely uncovered oscillatable unit lie within the excited frequency band, or the frequency band is selected in such a manner that the excited frequency band also includes frequencies, which occur in the case of an oscillatable unit immersed slightly in the medium or slightly covered with accretion. In latter case, the availability of the apparatus is increased without degrading safety.

In an embodiment, the electronics unit is configured in such a manner that the frequency band is passed through multiple times per second. For this, a corresponding step width between the individual exciter frequencies of the frequency band is predetermined as a function of the width of the frequency band. The apparatus can, thus, display the reaching of the fill level to be monitored especially rapidly. Preferably, the electronics unit produces an exciter signal continuously, so that the oscillatable unit is continuously excited with a frequency sweep to execute oscillations. The frequency band can, in such case, in each case, be passed through in the same direction, i.e., in each case, with rising or with decreasing frequencies, or alternately in different directions.

In an embodiment, the electronics unit is embodied to excite the mechanically oscillatable unit with frequencies within a second predetermined frequency band, wherein the frequencies of the second frequency band lie above the frequencies of the first frequency band, and to detect an oscillation within the second frequency band, whose amplitude exceeds a predetermined threshold value. For the case, in which the amplitude exceeds the threshold value, the electronics unit produces an alarm signal.

The frequency sweep in the second frequency range serves for corrosion detection. If no oscillation is detectable within the first frequency band, the electronics unit performs the frequency sweep in the second frequency band for corrosion detection. Also here, the electronics unit compares the electrical, received signal the driving/received signal with a predetermined threshold value, which lies above the noise level. If there is also in this second region no oscillation, then the maximum limit-level to be monitored has been achieved or an error has occurred in the measuring device. If the electronics unit detects an oscillation in the second frequency band, then the resonant frequency of the oscillatable unit has shifted due to corrosion and the apparatus issues an alarm signal, since, in this case, at least the oscillatable unit must be replaced.

In a preferred embodiment, the second frequency band includes frequencies between 105% and 107% of the resonant frequency at standard conditions.

In an embodiment, the electronics unit is at least partially embodied as a microcontroller. In an especially simple embodiment, the electronics unit is composed only, or at least essentially, of a microcontroller. Other components of the measuring device include, for example, an energy supply or means for connecting to an externally arranged energy supply, a signal output for outputting a switching signal indicating the fill level, for example, in the form of a 4-20 mA signal, and preferably at least one light-emitting diode for optical display of the switching state or an error state of the measuring device, for example, corrosion that has occurred. An embodiment with only a microcontroller, which produces the exciter signal for the driving/receiving unit and evaluates the received signal of the driving/receiving unit for determining the reaching of the predetermined fill level, is especially cost effectively and easily implementable.

In the case of a preferred embodiment, the driving/receiving unit includes at least one piezoelectric element. For example, it is a piezoelectric stack drive with transmitting elements and receiving elements, or a bimorph drive. The driving/receiving unit can also be embodied magneto-electrically or magnetostrictively.

An embodiment provides that the oscillatable unit is embodied as an oscillatory fork, rod, diaphragm or membrane.

BRIEF DESCRIPTION OF THE DRAWINGS

The invention will now be explained in greater detail based on the appended drawing, the figures of which show as follows.

DETAILED DESCRIPTION IN CONJUNCTION WITH THE DRAWINGS

Figure 1:
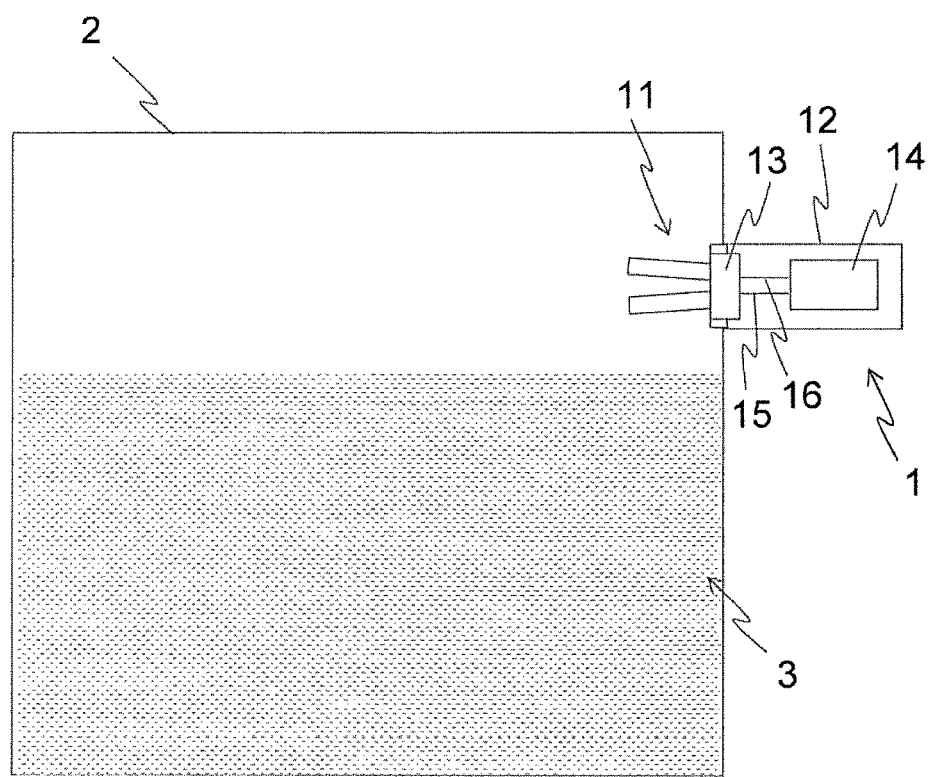
FIG. 1 shows schematically, a vibronic fill-level measuring device.

FIG. 1 shows a vibronic measuring device 1 of the invention, in which case the vibronic measuring device 1 is mounted on a container 2. Container 2 is partially filled with a liquid 3, whose fill level is to be monitored with reference to a maximum allowable limit-level. Equally, the measuring device 1 is, however, also suitable for monitoring a fill level of a bulk good. Measuring device 1 is mounted into the wall of the container 2 at the height corresponding to the fill level to be monitored, wherein the measuring device 1 protrudes inwardly into the container 2 essentially only with the oscillatable unit 11, while a housing 12 remains outside of the container 2. Accommodated in the housing 12 is an electronics unit 14, which is connected with the driving/receiving unit 13 via an electrical transmission line 15 and via an electrical receiving line 16. Depending on the embodiment of the driving/receiving unit 13, the transmission line and the receiving line can also be embodied as a shared transmitting and receiving line. The driving/receiving unit 13 is coupled with the mechanically oscillatable unit 11 and serves for exciting it to execute mechanical oscillations and for receiving the mechanical oscillations.

The oscillatable unit 11 is fork shaped, wherein two rod- or paddle-shaped tines are secured on a membrane or diaphragm. The membrane seals the at least sectionally tubular housing 12 terminally. An advantageous embodiment of a so-called oscillatory fork is disclosed, for example, in European Patent, EP 985916 B1. In another embodiment (not shown) of the measuring device 1, the oscillatable unit 11 is composed of only the membrane, or, alternatively, the oscillatable unit 11 is embodied as a so-called single rod. A single rod design comprises, as a rule, a tubular, external element and a rod shaped, internal element, wherein the inner element is coupled with the outer element and serves for mechanical decoupling of the oscillatory system, so that essentially no forces act on the securement to the container. An advantageously embodied single rod is described, for example, in Offenlegungsschrift, laid open Application, EP 1616156 A1.

Driving/receiving unit 13 is preferably embodied as a piezoelectric transducer unit. It can, however, also be a magnetoelectrical or magnetostrictive drive, or a combination of differently embodied driving and receiving units. Piezoelectric driving/receiving units 13 for vibronic measuring devices in different forms of embodiment are known sufficiently from the state of the art. Essentially, one distinguishes between one piezo technology and two piezo technology, wherein the two technologies are equally suitable for the measuring device 1 of the invention.

In the case of one piezo technology, the same piezoelectric element serves as transmitting element for exciting the mechanically oscillatable unit 11 to execute oscillations and as receiving element for receiving the mechanical oscillations and transforming such into an electrical signal, which can be read out. The piezoelectric element is preferably disc shaped and secured, for example by means of an adhesive, areally to the oscillatable unit 11. In an advantageous variant, a disc shaped piezoelectric element is divided into four segments for forming two transmitting electrodes and two receiving electrodes, which essentially lie as mutually opposing points. This form of embodiment is described in European Patent EP 1281051 B1.

In the case of two piezo technology, transmitting element and receiving element are separately embodied. In a variant for an oscillatory fork, a number of transmitting elements and receiving elements are arranged in a stack under prestress between a securement means in the housing 12 and the membrane of the fork shaped, oscillatable unit 11. An example of such construction is disclosed, for example, in European Patent EP 1261437 B1.

Electronics unit 14 controls the driving/receiving unit by supplying it with an electrical, alternating voltage signal in the form a frequency sweep.

Figure 2:
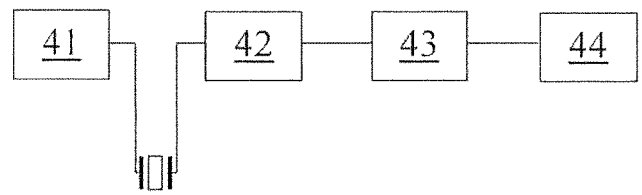
FIG. 2 is a block diagram of the electronics unit of a measuring device of FIG. 1.

FIG. 2 shows the construction of the electronics unit 14 of a measuring device 1 of FIG. 1 in the form of a block diagram. Preferably, the electronics unit 14 is digitally embodied, wherein supplementally some analog components are advantageous for signal conditioning. For example, the electronics unit 14 is a microcontroller.

The sweep generator 41 produces the exciter signal for the driving/receiving unit 13, wherein the frequencies of the exciter signal lie within a fixedly predetermined frequency band, which is passed through by the sweep generator 41. The driving/receiving unit 13 is supplied thereby with an electrical signal with discrete frequencies sequentially following one another. The frequency band includes, in such case, the resonant frequency of the oscillatable unit 11 at standard conditions, i.e. in air at standard pressure and room temperature, as well as frequencies lying in a narrow region around this resonant frequency.

The upper limit frequency of the frequency band corresponds to the highest resonant frequency of the oscillatable unit arising in a specified temperature range and a specified pressure range; the lower limit frequency corresponds accordingly to the lowest resonant frequency arising in these ranges. The specified temperature range is the temperature range, in which the measuring device 1 is applicable or at least a range, in which the measuring device 1 is typically applied. For example, the specified temperature range extends from −50° C. to +150° C. Preferably, the frequencies, which the sweep generator 41 produces, lie for said temperature range within a region of −5% to +5%, further preferably −3.5% to +3.5%, especially of −3% to +2%, of the resonant frequency at standard conditions. In an embodiment, in the case of which also an oscillatable unit 11 covered with a slight accretion or slightly immersed in the medium should be signaled as "uncovered", the lower limit frequency lies at a lower frequency, for example, at −15% of the resonant frequency at standard conditions. The choice of the optimal frequency range for the frequency sweep is dependent, for example, on the material of the oscillatable unit 11.

The sweep bandwidth of the sweep generator 41 is fixedly predeterminable or, depending on application of the measuring device 1, individually adjustable. Such an adjusting is implementable especially simply by the digital embodiment of the electronics unit 14. The sweep bandwidth is, thus, optimally predeterminable for the respective conditions of use. Especially for the case, in which the measuring device 1 is applied in only a narrow temperature range, the sweep bandwidth can be correspondingly narrowly selected, so that the time required for passing through the frequency band can be minimized.

The sweep generator 41 produces the exciter signal with discrete exciter frequencies. The step width, with which the sweep generator passes through the frequency band, is selected in such a manner that the complete frequency band is passed through within some multiple of 100 ms. Preferably, a continuous exciting is used, i.e. each pass through is followed directly by the next pass through of the frequency band. In the case of suitably selected step width, thus, at least two, preferably three or more pass-throughs take place per second. The faster the sweep generator 41 passes through the predetermined frequency range, the faster is a response signal available and the faster a reaching of the fill level to be monitored can be reacted to.

The frequency band can be passed through with rising or decreasing frequencies. In an embodiment, an excitation in the increasing direction is followed by an excitation in the decreasing direction. A continuous excitation in the same direction is, however, likewise possible.

In the state of the art, the oscillation excitement occurs, as a rule, via an oscillatory circuit, wherein the received signal is conditioned and fed back to the driving/receiving unit 13. The output signal acquires, in such case, a predeterminable phase shift relative to the received signal. In this way, a controlled, forced excitation with the respectively current resonant frequency is achieved. In contrast, in this connection, the oscillatable unit 11 in the invention is at no time forced with an unfavorable phase relationship to oscillate. The exciter signal is produced independently of the received signal, i.e. without feedback. The resonant frequency is not actively located, but, instead, it is only checked whether the resonant frequency lies within the predetermined frequency band.

If the oscillatable unit 11 is located in air or in some other gas, the current resonant frequency of the oscillatable unit 11 lies within the frequency band, with which the sweep generator 41 is producing the exciter signal. The driving/receiving unit 13, which converts the electrical exciter signal into a mechanical movement, excites the oscillatable unit 11 to resonant oscillations. These are distinguished by their high amplitude, which shows up in the electrical, received signal of the driving/receiving unit 13. An evaluation of amplitude is, consequently, best suited for detecting the resonant oscillations. For evaluation, however, not the resonant frequency is located and the amplitude measured at this frequency, but, instead, the received signal received in the case of a sweep pass-through is evaluated as a whole with reference to amplitude. The components for evaluating the received signal are embodied to detect the presence of a resonant oscillation within the excited frequency band, wherein it is irrelevant, at which of the frequencies the oscillation occurs. Solely the information concerning the presence of the resonant oscillation within the excited frequency range suffices, in order to be able to make a reliable statement that the oscillatable unit 11 is free of the medium to be detected.

The components of the electronics unit 14 serving for evaluating the received signal and for producing an output signal are a filter unit 42, a trigger unit 43 and an output stage 44. The filter unit 42, for example, filters from the received signal signals, which arise from unwanted vibrations in the container or an adjoining pipeline. The filter unit 42 improves the signal to noise ratio. For example, the filter unit 42 includes a rectifier and at least one component for smoothing the received signal. In an embodiment, the filter unit 42 is embodied with analog components, while the remaining functional elements are digitally embodied, preferably as functions of a microcontroller. Fed to the microcontroller is the received signal conditioned by the filter unit 42.

Trigger unit 43 compares the amplitude of the received signal with a predetermined threshold value and produces an output signal, whose value depends on whether the threshold value has been ex- or sub-ceeded. The threshold value is set in such a manner that an exceeding of the threshold value means a freely oscillating oscillatable unit 11. In the case of a measuring device installed for detection of a maximum fill level, an exceeding of the threshold value corresponds to the normal state. If the oscillatable unit 11 is covered with the medium to be detected, there results, because of the media related shifting of the resonant frequency, no more resonant oscillation in the excited frequency range and the predetermined threshold value is no longer exceeded, whereby the output signal of the trigger unit 43 changes.

The output signal of trigger unit 43 is fed to the output stage 44 as control signal. For example, the output stage 44 is embodied as a relay. The output stage 44 issues a switching signal, which shows whether the oscillatable unit 11 is covered by or free of the medium to be detected, i.e. whether the fill level to be monitored has been achieved. This switching signal represents the output signal of the measuring device 1 and is, for example, forwardable to a control room or to downstream field devices, for example, also as a control signal for pumps or valves.

Resonant oscillations in the medium to be detected are irrelevant for the oscillation excitement and evaluation of the invention, since only the resonant oscillations of a freely oscillating, or an at least essentially freely oscillating, oscillatable unit 11 are excited and evaluated. Thus, electronic components usually numerously present in vibronic measuring devices 1 can be omitted, namely those which serve to achieve a resonant oscillation in media as much as desired dense or viscous. This saves not only space but also costs. Furthermore, the embodiment of the invention of the electronics unit enables detecting the reaching of a fill level to be monitored very rapidly. In this way, in given cases required measures, such as the stopping of further supply of medium, can be performed timely. Furthermore, measuring device 1 is also applicable as a minimum-switch for monitoring a minimum fill level.

In an embodiment, the sweep generator 41 produces for the case, in which no resonant oscillation is present in the excited frequency band, i.e. the received signal does not exceed the threshold value, an exciter signal with frequencies within a second frequency band. Analogously to the first frequency band, the sweep generator 41 passes through the second frequency band with discrete frequencies sequentially following one another. The second frequency band adjoins above on the first frequency band, i.e. it includes frequencies, which lie above the upper limit frequency of the first frequency band. The second frequency band can also be arranged spaced from the first frequency band, so that other frequencies lie between the upper limit frequency of the first frequency band and the lower limit frequency of the second frequency band, which the sweep generator 41 does not produce.

By exciting the oscillatable unit 11 in the second frequency range with higher frequencies relative to the first frequency band, a detecting of corrosion occurring in the oscillatable unit 11 is enabled. Corrosion leads to an increasing of the resonant frequency, so that the resonant frequency of the oscillatable unit 11 with increasing corrosion drifts out from the frequency range covered by the frequency sweep. By exciting the second frequency band, such a corrosion related shifting of the resonant oscillation is detectable. Thus, in the case of a missing oscillation in the first frequency band, it can be distinguished whether the absence of the oscillation is caused by a covering with the medium to be detected or a malfunction of the measuring device, or, instead, is to be attributed to corrosion. The corrosion review by means of excitation within the second frequency band can be performed directly after the detection of the absence of an oscillation in the first frequency band, or, in case no oscillation occurs in the first frequency band over a longer period of time, recurringly at certain time intervals.

A preferred region of the second frequency band extends from a lower limit frequency, which corresponds to 105% of the resonant frequency at standard conditions, up to an upper limit frequency, which corresponds to 107% of this resonant frequency.

The corrosion alarm is displayable, for example, in the form of an optical signal by means of a light-emitting diode or by means of an electrical output signal. In an embodiment, the output signal output via the output stage 44 contains as first information the limit-level and as second information a statement concerning whether corrosion has occurred or not. For example, the measuring device 1 can show that the limit-level has not been achieved and the oscillatable unit 11 is freely oscillating, but that, however, corrosion has occurred. In another embodiment, in the case of corrosion, the same output signal is produced, which is also produced in the case of a reaching of the limit level and via a second signal output a signal is output, which indicates the presence of corrosion or, more generally, a required maintenance of the measuring device 1.

LIST OF REFERENCE CHARACTERS 1 measuring device
11 oscillatable unit
12 housing
13 driving/receiving unit
14 electronics unit
15 transmission path
16 receiving path
2 container
3 liquid
41 sweep generator
42 filter unit
43 trigger unit
44 output stage

The invention claimed is:
1. An apparatus for monitoring a predetermined fill level of a medium in a container, comprising:
    a mechanically oscillatable unit;
    a driving/receiving unit for exciting said mechanically oscillatable unit to execute mechanical oscillations and for receiving the oscillations of said mechanically oscillatable unit; and an electronics unit for producing an electrical exciter signal and for evaluating an electrical, received signal, wherein:

said electronics unit is embodied to excite the mechanically oscillatable unit by means of said driving/receiving unit to execute mechanical oscillations within a fixedly predetermined, narrow frequency band with discrete, sequentially following, exciter frequencies;

the frequency band contains the resonant frequency of said mechanically oscillatable unit in the case of an oscillation under standard conditions;

said electronics unit comprises a trigger unit which is embodied to compare the amplitude of the received signal with a predetermined threshold value; and said electronics unit is embodied to detect whether, within the predetermined frequency band an oscillation of said mechanically oscillatable unit occurs, whose amplitude exceeds the predetermined threshold value, and said electronics unit is embodied to execute oscillations only in a frequency range in which the resonant frequency of the oscillatable unit not completely immersed in the medium is located.

2. The apparatus as claimed in claim 1, wherein:
said electronics unit detects the amplitude of the electrical, received signal of said driving/receiving unit and compares it with a predetermined limit value.

3. The apparatus as claimed in claim 1, wherein:
the frequency band includes frequencies between 85% and 105%, of the resonant frequency at standard conditions.

4. The apparatus as claimed in claim 1, wherein:
said electronics unit is configured in such a manner that the frequency band is passed through multiple times per second.

5. The apparatus as claimed in claim 1, wherein:
said electronics unit is at least partially embodied as a microcontroller.

6. The apparatus as claimed in claim 1, wherein:
said driving/receiving unit has at least one piezoelectric element.

7. The apparatus as claimed in claim 1, wherein:
said oscillatable unit is embodied as an oscillatory fork, rod, diaphragm or membrane.

8. The apparatus as claimed in claim 1, wherein:
the frequency band includes frequencies between 95% and 102% of the resonant frequency at standard conditions.

9. An apparatus for monitoring a predetermined fill, level of a medium in a container, comprising:

a mechanically oscillatable unit;

a driving/receiving unit for exciting said mechanically oscillatable unit to execute mechanical oscillations and for receiving the oscillations of said mechanically oscillatable unit; and an electronics unit for producing an electrical exciter signal and for evaluating an electrical, received signal, wherein:

said electronics unit is embodied to excite the mechanically oscillatable unit by means of said driving/receiving unit to execute mechanical oscillations within a fixedly predetermined, narrow frequency band with discrete, sequentially following, exciter frequencies;

the frequency band contains the resonant frequency of said mechanically oscillatable unit in the case of an oscillation under standard conditions;

said electronics unit is embodied to detect whether, within the predetermined frequency band an oscillation of said mechanically oscillatable unit occurs, whose amplitude exceeds a predetermined threshold value; and said electronics unit is embodied to excite said mechanically oscillatable unit with frequencies within a second predetermined frequency band; and the frequencies of the second frequency band lie above the frequencies of the first frequency band, and to detect an oscillation within the second frequency band, whose amplitude exceeds the threshold value, said electronics unit produces an alarm signal.

10. The apparatus as claimed in claim 9, wherein:
the second frequency band includes frequencies between 105% and 107% of the resonant frequency at standard conditions.

* * * * *